(12) United States Patent
Chen et al.

(10) Patent No.: US 11,714,426 B2
(45) Date of Patent: Aug. 1, 2023

(54) POSITIONING SYSTEM AND METHOD BASED ON NEURAL NETWORK MODEL

(71) Applicant: PSJ INTERNATIONAL LTD., Tortola (VG)

(72) Inventors: Chung-Yuan Chen, Tainan (TW); Alexander I Chi Lai, Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 387 days.

(21) Appl. No.: 17/184,694

(22) Filed: Feb. 25, 2021

(65) Prior Publication Data
US 2021/0274460 A1    Sep. 2, 2021

Related U.S. Application Data

(60) Provisional application No. 62/982,073, filed on Feb. 27, 2020.

(51) Int. Cl.
*G05D 1/02* (2020.01)
*H04W 84/18* (2009.01)
(Continued)

(52) U.S. Cl.
CPC ......... *G05D 1/0285* (2013.01); *G01C 21/005* (2013.01); *G01C 21/206* (2013.01);
(Continued)

(58) Field of Classification Search
CPC ....... H04W 64/00; H04W 4/02; H04W 4/029; H04W 4/021; H04W 4/025; H04W 88/04;
(Continued)

(56) References Cited

U.S. PATENT DOCUMENTS 8,849,308 B2 * 9/2014 Marti .................... H04W 4/021
455/456.2
8,933,841 B2 * 1/2015 Valaee ................ G01S 5/02521
342/357.31

(Continued)

FOREIGN PATENT DOCUMENTS

| CN | 106131959 B | 5/2019 |
|---|---|---|
| CN | 108534779 B | 9/2020 |
| TW | I587717 B | 6/2017 |

*Primary Examiner* — Srilakshmi K Kumar
*Assistant Examiner* — Jing Gao
(74) *Attorney, Agent, or Firm* — Li & Cai Intellectual Property (USA) Office

(57) ABSTRACT

A positioning system and a method based on neural network models are provided. The positioning method includes collecting WI-FI® fingerprint data; configuring a computing device to receive the WI-FI® fingerprint data, and the computing device includes a processor and a database storing positioning map data and a group of neural network models including a global positioning model, a coarse positioning model and a fine positioning model; configuring the processor to input the WI-FI® fingerprint data and perform the following steps: estimating a global coordinate through the global positioning model; obtaining the corresponding coarse positioning model from a corresponding primary sub-region to estimate an estimated coarse coordinate of a current position; estimating a plurality of estimated fine coordinates of the current position from the corresponding fine positioning model; and performing a merging process on the estimated fine coordinates to generate a final coordinate.

10 Claims, 15 Drawing Sheets

(51) Int. Cl.

| | |
|---|---|
| *G06F 16/906* | (2019.01) |
| *G06N 20/00* | (2019.01) |
| *G06F 16/907* | (2019.01) |
| *H04W 4/024* | (2018.01) |
| *G01C 21/00* | (2006.01) |
| *G01C 21/20* | (2006.01) |
| *G01S 13/02* | (2006.01) |
| *H04W 4/02* | (2018.01) |
| *H04W 64/00* | (2009.01) |
| *H04W 84/12* | (2009.01) |
| *G06V 20/70* | (2022.01) |
| *G06V 20/10* | (2022.01) |
| *G06F 18/214* | (2023.01) |
| *H04W 72/29* | (2023.01) |

(52) U.S. Cl.
CPC ........ *G01S 13/0209* (2013.01); *G05D 1/0248* (2013.01); *G05D 1/0257* (2013.01); *G05D 1/0282* (2013.01); *G06F 16/906* (2019.01); *G06F 16/907* (2019.01); *G06F 18/214* (2023.01); *G06N 20/00* (2019.01); *G06V 20/10* (2022.01); *G06V 20/70* (2022.01); *H04W 4/023* (2013.01); *H04W 4/024* (2018.02); *H04W 4/025* (2013.01); *H04W 64/003* (2013.01); *H04W 72/29* (2023.01); *H04W 84/12* (2013.01); *H04W 84/18* (2013.01)

(58) Field of Classification Search
CPC ..... H04W 4/023; H04W 16/18; H04W 8/245; H04W 8/18; H04W 72/0406; H04W 88/08; H04W 88/12; H04W 16/00; H04W 36/08; H04W 48/18; H04W 48/12; H04W 72/04; H04W 8/205; H04W 36/14; H04W 48/17; H04W 88/005; H04W 92/18; H04W 12/033; H04W 12/63; H04W 12/76; H04W 8/26
See application file for complete search history.

(56) References Cited

U.S. PATENT DOCUMENTS

| | | | |
|---|---|---|---|
| 9,576,236 | B2 | 2/2017 | Proud et al. |
| 2008/0167049 | A1* | 7/2008 | Karr .................. G01S 5/0278 455/456.2 |
| 2015/0181551 | A1* | 6/2015 | Sonnenburg ......... G08G 1/0141 455/456.1 |
| 2017/0328716 | A1* | 11/2017 | Ma .................... G01C 21/1656 |

\* cited by examiner

POSITIONING SYSTEM AND METHOD BASED ON NEURAL NETWORK MODEL

CROSS-REFERENCE TO RELATED PATENT APPLICATION

This application claims priority to the U.S. Provisional Patent Application Ser. No. 62/982,073 filed on Feb. 27, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning system and a positioning method, and more particularly to a positioning system and a positioning method based on neural network models.

BACKGROUND OF THE DISCLOSURE

With an expansion of mobile computing nodes and advancement of wireless technology, demands for accurate indoor positioning and related services have become more and more popular. Reliable and accurate indoor positioning can support a wide range of applications.

However, many issues are still present in existing indoor positioning systems. For example, these systems are often imprecise, too complex to implement, and/or too expensive. Although an indoor positioning system based on WI-FI® and received signal strength indicator (RSSI) signals have high accuracy, the number of WI-FI® signals may be too high in the same field, which causes complexity and change rates thereof to be too high. Therefore, it is difficult to establish an accurate positioning system purely based on WI-FI® signals and signal strengths.

In addition, when a field area used for positioning is too large, the time required for positioning is extended, thereby increasing usage of system computing resources, and deteriorating positioning accuracy.

SUMMARY OF THE DISCLOSURE

In response to the above-referenced technical inadequacies, the present disclosure provides a positioning system and a positioning method based on neural network models.

In one aspect, the present disclosure provides a positioning system based on neural network models, the positioning system includes a wireless device and a computing device. The wireless device is configured to collect WI-FI® fingerprint data at a current position where the wireless device located in a target area. The computing device includes a processor, a communication module and a database. The communication module is configured to receive collected WI-FI® fingerprint data from the wireless device. The database is configured to store positioning map data of the target area and a group of neural network models, the positioning map data includes a plurality of records of WI-FI® fingerprint data corresponding to a plurality of collection points in the target area and a group of neural network models, the target area is divided into a plurality of primary sub-regions, and each of the primary sub-regions further includes a plurality of secondary sub-regions, the group of neural network models is generated by performing a training process according to the positioning map data and a model definition file and includes a global positioning model, a plurality of coarse positioning models, and a plurality of fine positioning models. The global positioning model is used for estimating a global coordinate in the target area based on input WI-FI® fingerprint data. The plurality of coarse positioning models respectively correspond to the primary sub-regions, and each of the coarse positioning models is used for estimating a coarse coordinate in the corresponding primary sub-region based on the input WI-FI® fingerprint data. The plurality of fine positioning models respectively correspond to the plurality of secondary sub-regions, and each of the plurality of fine positioning models is used for estimating a fine coordinate in the secondary sub-region based on the input WI-FI® fingerprint data. The processor is configured to input the collected WI-FI® fingerprint data into the trained group of neural network models, and execute the following steps: estimating an estimated global coordinate of the current position according to the collected WI-FI® fingerprint data through the global positioning model; obtaining the corresponding coarse positioning model according to the primary sub-region corresponding to the estimated global coordinate; estimating an estimated coarse coordinate of the current position according to the collected WI-FI® fingerprint data through the obtained coarse positioning model; obtaining the corresponding fine positioning models according to the secondary sub-regions corresponding to the estimated coarse coordinate; estimating a plurality of estimated fine coordinates of the current position according to the collected WI-FI® fingerprint data through the obtained fine positioning models; and performing a merging process on the plurality of estimated fine coordinates to generate a final coordinate as the current position of the wireless device in the target area.

In some embodiments, the training process includes: training the global positioning model with the plurality of records of WI-FI® fingerprint data in the target area; training each one of the plurality of coarse positioning models with the records of WI-FI® fingerprint data of the corresponding one of the plurality of primary sub-regions; and training each one of the plurality of fine positioning models with the records of WI-FI® fingerprint data of the corresponding one of the plurality of secondary sub-regions.

In some embodiments, the training process further includes performing a preprocessing process on the plurality of records of WI-FI® fingerprint data, and the preprocessing process includes: filtering and sorting the plurality of records of WI-FI® fingerprint data according to a plurality of feature lists of WI-FI® access points with high discrimination index to generate a plurality of input feature vectors. Each element in one of the vectors corresponds to an actual measurement value of the feature lists of WI-FI® access points with high discrimination index, and each of the input feature vectors corresponds to a simultaneous measurement of the feature lists of WI-FI® access points, such that the plurality of records of WI-FI® fingerprint data correspond to the input feature vectors. During the filtering process, if there are missing features for certain WI-FI® access points in the simultaneous measurement, a default value is filled in to represent a missing situation and to reduce the impact on the subsequent numerical calculations; and a normalization algorithm is executed on each of the input feature vectors to normalize the input feature vectors.

In some embodiments, the merging process includes: obtaining the secondary sub-regions covering the plurality of estimated fine coordinates, respectively, wherein the plurality of secondary sub-regions respectively correspond to a plurality of secondary sub-region center points; calculating, according to distances between the plurality of secondary sub-region center points and the plurality of estimated fine coordinates, a plurality of weight values corresponding to the plurality of estimated fine coordinates; and calculating the final coordinate according to the plurality of weight values and the plurality of estimated fine coordinates.

In some embodiments, the global positioning model, the plurality of coarse positioning models and the plurality of fine positioning models are each a deep neural network model, the deep neural network model includes an input layer, a plurality of hidden layers, and an output layer, and the plurality of hidden layers each uses an activation function.

In another aspect, the present disclosure provides a positioning method based on neural network models, the positioning method includes: configuring a communication module included in a computing device to receive collected WI-FI® fingerprint data from the wireless device, wherein the computing device further includes a processor and a database, the database is configured to store positioning map data of the target area and a group of neural network models. The positioning map data includes a plurality of records of WI-FI® fingerprint data corresponding to a plurality of collection points in the target area and a group of neural network models, the target area is divided into a plurality of primary sub-regions, and each of the primary sub-regions further includes a plurality of secondary sub-regions, wherein the group of neural network models is generated by performing a training process according to the positioning map data and a model definition file and includes a global positioning model, a plurality of coarse positioning models and a plurality of fine positioning models. The global positioning model is used for estimating a global coordinate in the target area based on input WI-FI® fingerprint data. The plurality of coarse positioning models respectively correspond to the primary sub-regions, and each of the coarse positioning models is used for estimating a coarse coordinate in the corresponding primary sub-region based on the input WI-FI® fingerprint data. The plurality of fine positioning models respectively corresponding to the plurality of secondary sub-regions, and each of the plurality of fine positioning models is used for estimating a fine coordinate in the secondary sub-region based on the input WI-FI® fingerprint data. The positioning method further includes configuring the processor to input the collected WI-FI® fingerprint data into the trained group of neural network models, and execute the following steps: estimating an estimated global coordinate of the current position according to the collected WI-FI® fingerprint data through the global positioning model; obtaining the corresponding coarse positioning model according to the primary sub-region corresponding to the estimated global coordinate; estimating an estimated coarse coordinate of the current position according to the collected WI-FI® fingerprint data through the obtained coarse positioning model; obtaining the corresponding fine positioning models according to the secondary sub-regions corresponding to the estimated coarse coordinate; estimating a plurality of estimated fine coordinates of the current position according to the collected WI-FI® fingerprint data through the obtained fine positioning models; and performing a merging process on the plurality of estimated fine coordinates to generate a final coordinate as the current position of the wireless device in the target area.

Therefore, the positioning system and positioning method based on the neural network models provided by the present disclosure can progressively refine the coordinate of an object to be measured by adopting the group of the neural network models, from a large scope to a small scope, and from low accuracy to high accuracy.

In addition, multiple positioning models are individually trained using different subsets of WI-FI® fingerprint data according to the divided global area, primary sub-regions, and secondary sub-regions, thereby obtaining trained positioning models having different positioning scopes and different positioning accuracies. The time required for initial positioning and the overall system computing resources used during positioning can be saved, and high accuracy can be maintained in the end.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
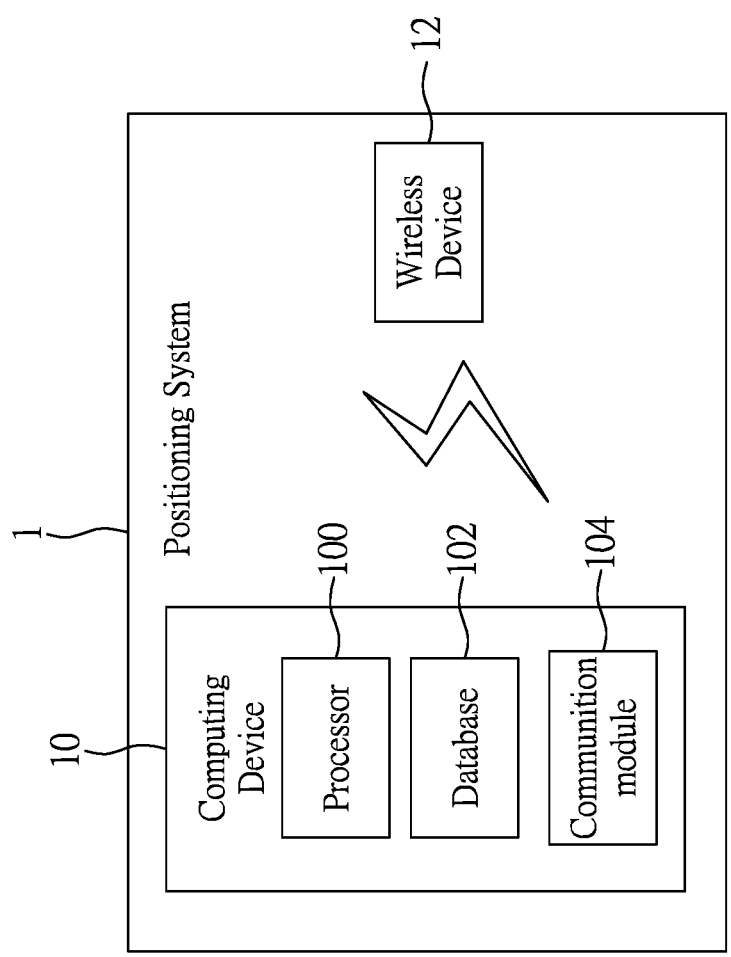
FIG. 1 is a block diagram of a positioning system based on neural network models according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a block diagram of a positioning system based on neural network models according to an embodiment of the present disclosure. Reference is made to FIG. 1, in which an embodiment of the present disclosure provides a positioning system 1 based on neural network models, and the positioning system 1 includes a wireless device 12 and a computing device 10.

In detail, the wireless device 12 is configured to collect WI-FI® fingerprint data at a current position where the wireless device 12 located in a target area. The wireless device 12 can include a wireless transceiver to receive and transmit signals, and the wireless device 12 can be, for example, a mobile device such as a tablet computer, a mobile phone, or a proprietary hardware platform. In detail, the wireless device 12 is mainly configured to utilize a detected number of WI-FI® access points, signal strength indicators RSSIs of detectable WI-FI® access points, channel information of detectable WI-FI® access points, characteristic information generated during a communication process with the detected WI-FI® access points to generate WI-FI® fingerprints.

However, not all embodiments are limited to above fingerprint technology, and other WI-FI® location technologies can also be used to simultaneously mix data from various radio sources, such as combined WI-FI®, IEEE 802.11mc distance measuring data, radio frequency identification (RFID), wireless BLUETOOTH® transmission of data, or ultra-wideband (UWB) ranging module, and non-wireless RF signal data can also be combined, such as signal data from inertial measurement unit and environmental measurement unit.

In some embodiments, the wireless device 12 can be, for example, a mobile device, which includes a processing unit (for example, a processor), a storage unit (for example, flash memory) and a transceiver unit (for example, a WI-FI® module supporting 2.4G/5G frequency band) electrically connected to the processing unit.

The computing device 10 includes a processor 100, a database 102 and a communication module 104. The computing device 10 can include any suitable processor-driven computing device, including but not limited to desktop computing devices, laptop computing devices, servers, smart phones, tablet computers, and the like. The processor 100 can be an integrated circuit such as a programmable logic controller circuit, a micro-processor circuit, or a micro-control circuit, or an electronic device including the aforementioned integrated circuit, such as tablet computer, mobile phone, notebook computer or desktop computer, but the present disclosure is not limited thereto.

Figure 2:
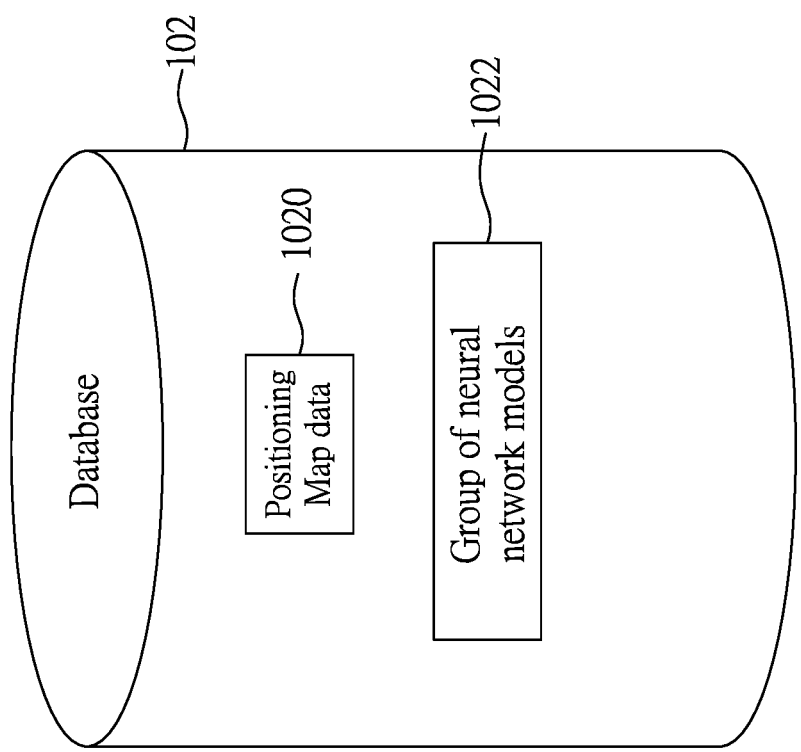
FIG. 2 is a schematic diagram of a database according to an embodiment of the present disclosure.
Figure 3:
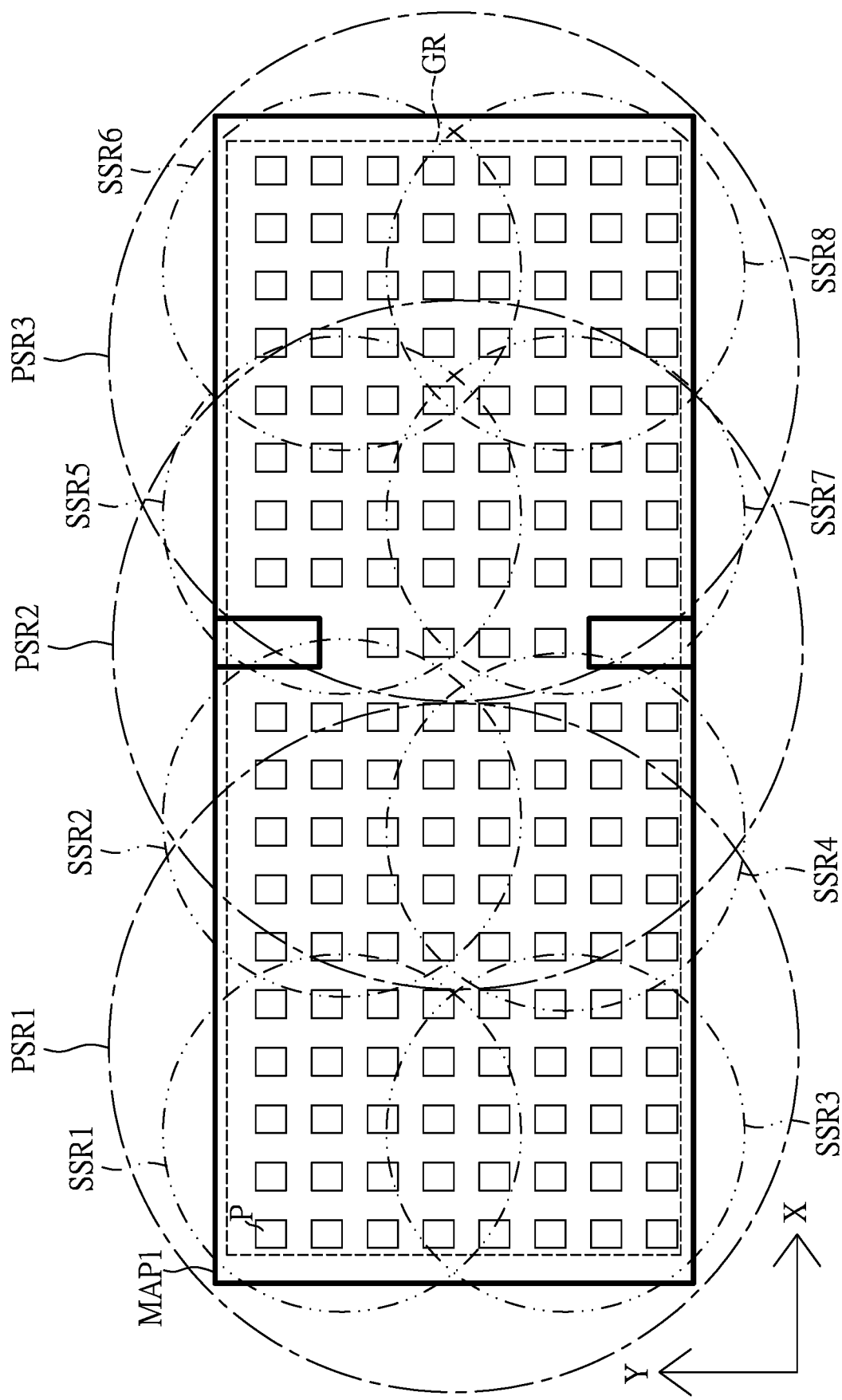
FIG. 3 is a schematic diagram of a target area and multiple collection points according to an embodiment of the present disclosure.

Reference can be further made to FIGS. 2 and 3, FIG. 2 is a schematic diagram of a database according to an embodiment of the present disclosure, and FIG. 3 is a schematic diagram of a target area and multiple collection points according to an embodiment of the present disclosure. As shown in FIG. 2, the database 102 stores positioning map data 1020 of a target area and a group of neural network models 1022, where the positioning map data 1020 includes a plurality of records of WI-FI® fingerprint data corresponding to a plurality of collection points in the target area. The database 102 can be, for example, a memory system, which can include non-volatile memory (such as flash memory) and system memory (such as DRAM), and related supporting database management software can be included in the database 102.

In detail, as shown in FIG. 3, a target area MAP1 can be an indoor place or building that is predetermined to perform positioning, the positioning map data 1020 can include one or more maps of each floor of the place or building mentioned above. The plurality of target collection points P can be multiple coordinates scattered on the area map MAP1, and the plurality of records of WI-FI® fingerprint data can be, for example, WI-FI® fingerprint data obtained by the user in advance from the target collection points in the target area, and can include WI-FI® fingerprint data detected by a wireless receiver at each target collection point.

It should be noted that the target area MAP1 as a whole can be regarded as a global area GR, and the global area GR can be divided into a plurality of primary sub-regions, such as primary sub-regions PSR1, PSR2, and PSR3, and each of these primary sub-regions further includes a plurality of secondary sub-regions, for example, the primary sub-region PSR1 can be divided into secondary sub-regions SSR1, SSR2, SSR3, and SSR4, and the primary sub-region PSR3 can be divided into secondary sub-regions SSR5, SSR6, SSR7, and SSR8, but the present disclosure is not limited thereto. In addition, divisions of the primary sub-region and the secondary sub-regions are not limited to circles as shown in FIG. 3, and can also be divided into rectangles, triangles, or polygons, and the present embodiment does not limit the manner.

Figure 4:
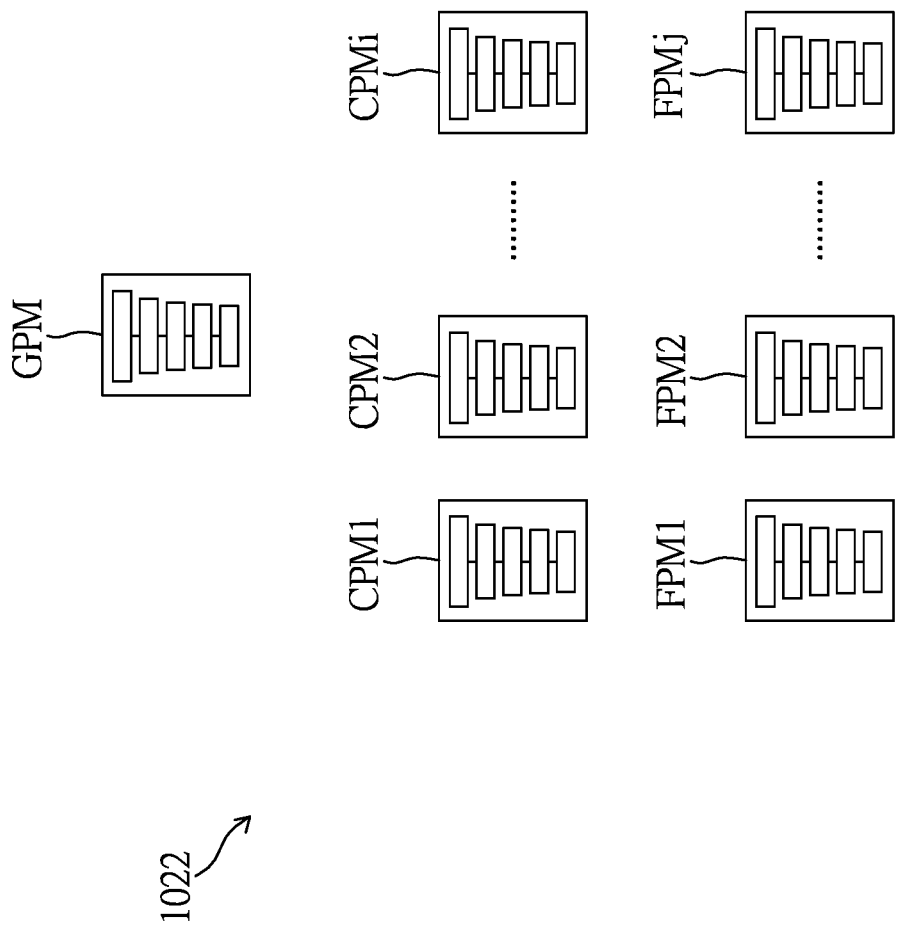
FIG. 4 is a schematic diagram showing a structure of a multi-level neural network model combination according to an embodiment of the present disclosure.

The group of neural network models 1022 used in the present disclosure is further described. Reference is made to FIG. 4, which is a schematic diagram showing a structure of a multi-level neural network model combination according to an embodiment of the present disclosure. As shown in the figure, the group of neural network models 1022 is generated by performing a training process with the positioning map data 1020 and model definition files, and the group of neural network models 1022 includes a global positioning model GPM, a plurality coarse positioning models CPM1, CPM2, . . . , CMPi, and a plurality of fine positioning models FPM1, FPM2, . . . , FPMj.

The model definition files refer to a set of code files including structure definitions of the positioning models and detailed settings of data pre-processing, post-processing parameters, and the like. After this set of code is executed by a specific command, the WI-FI® fingerprint data set for training can be received, steps of preprocessing, model creation, model training, and model storage can then be performed to generate a trained positioning model module.

In detail, according to a size of the target area MAP1, the number of the records of WI-FI® fingerprint data and variations of each record of data may cause the neural network to exceed a limitation for it to learn and make effective predictions during the training process, such that a trade-off between breadth and accuracy should be considered. Therefore, the group of neural network models 1022 of the present disclosure utilizes multi-level structures. According to divided partitions, including the global area, the primary sub-regions and secondary sub-regions, the plurality of positioning models are trained using different WI-FI® fingerprint data to obtain trained positioning models with different positioning scopes and different positioning accuracies.

In this embodiment, the global positioning model GPM can be used to estimate a global coordinate in the global area GR based on the input WI-FI® fingerprint data.

On the other hand, the coarse positioning models CPM1, CPM2, . . . , CMPi can respectively correspond to the plurality of primary sub-regions divided from the target area MAP1, such as primary sub-regions PSR1, PSR2, and PSR3, and each of the coarse positioning models CPM1, CPM2, . . . , CMPi is used to estimate a coarse coordinate in the primary sub-regions PSR1, PSR2, and PSR3 based on the input WI-FI® fingerprint data. The number of coarse positioning models CPM1, CPM2, . . . , CMPi can correspond to the total number of primary sub-regions.

In addition, the fine positioning models FPM1, FPM2, . . . , FPMj respectively correspond to the secondary sub-regions divided from the primary sub-regions, for example, the aforementioned secondary sub-regions SSR1 to SSR8, and each of the fine positioning models FPM1, FPM2, . . . , FPMj can be used to estimate the corresponding fine coordinate in the secondary sub-region based on the input WI-FI® fingerprint data.

It should be noted that the above-mentioned global positioning model GPM, coarse positioning models CPM1, CPM2, . . . , CMPi and fine positioning models FPM1, FPM2, . . . , FPMj are formed by conceptually dividing a space into a plurality of areas from large to small with accuracies from coarse to fine, so as to maximize the benefits of each model, and a multi-level arrangement is not limited to this example. For example, the global positioning model GPM may correspond to the divisions of buildings and floors, and the coarse positioning models CPM1, CPM2, . . . , CMPi and the fine positioning models FPM1, FPM2, . . . , FPMj may correspond to overlapping spaces in the floors, which may correspond to finer positioning models.

Figure 5:
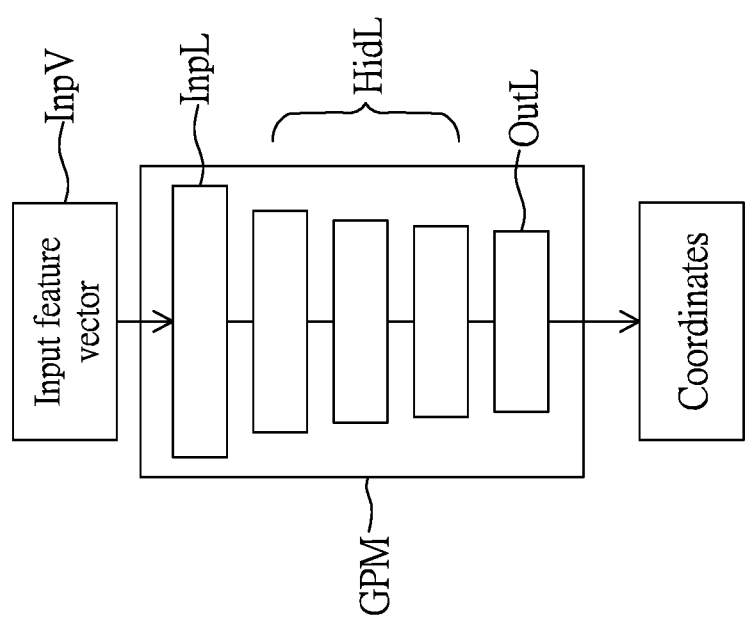
FIG. 5 is a schematic diagram showing architecture of deep neural network models for a global positioning model, a coarse positioning model, and a fine positioning model according to an embodiment of the present disclosure.

Before explaining the positioning process of the group of neural network models, the training process is first explained. FIG. 5 is a schematic diagram showing architecture of deep neural network models for a global positioning model, a coarse positioning model, and a fine positioning model according to an embodiment of the present disclosure. As shown in FIG. 5, the aforementioned global positioning model, coarse positioning model, and fine positioning model can each be a deep neural network model with this architecture. Taking the global positioning model GPM as an example, the deep neural network model used includes an input layer InpL, a plurality of hidden layers HidL, and an output layer OutL, and the input layer, the hidden layers, and the output layer each includes an activation function used to non-linearly adjust output results of the input layer, the plurality of hidden layers and the output layer. In other embodiments, these positioning models can be designed in whole or in part corresponding to a multi-level structure in an integrated neural network model. The integrated neural network also has a common input layer, a plurality of hidden layers, and a composite output layer, and the integrated neural network model is used as an entity for establishment, training and operation.

In detail, the activation function can be used to adjust the output results of the input layer, the hidden layers and the output layer in a non-linear manner, such that the deep neural network model has an ability to fit complex and non-linear conversion relationship between input and output, thereby improving a predictive ability of the positioning model. The activation function can be a saturated activation function or a non-saturated activation function. When the activation function is the saturated activation function, architectures such as tan h and sigmoid can be used, and when the activation function is the non-saturated activation function, a linear rectification function (Rectified Linear Unit, ReLU) or its modified architecture (such as ELU, Leaky ReLU, PReLU or other modified architectures) can be used.

Figure 6:
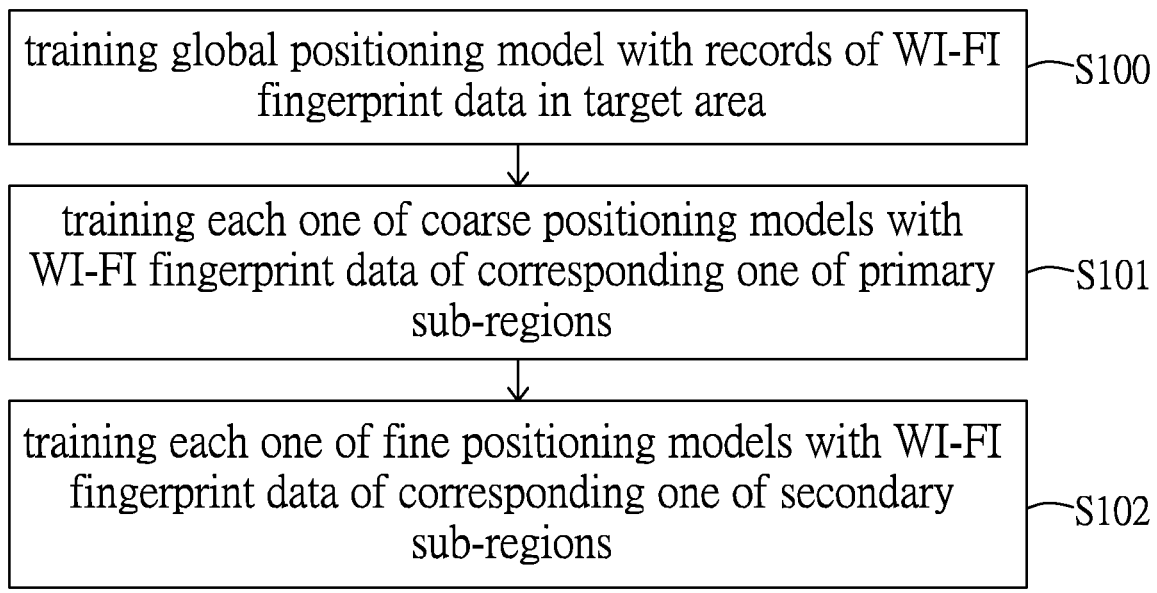
FIG. 6 is a flowchart of a training process for a group of neural network models according to an embodiment of the present disclosure.

Further, reference is made to FIG. 6, which is a flowchart of a training process for a neural network model group according to an embodiment of the present disclosure. As shown in FIG. 6, the training process includes the following steps:

Step S100: training the global positioning model with the plurality of records of WI-FI® fingerprint data in the target area.

Step S101: training each one of the plurality of coarse positioning models with the records of WI-FI® fingerprint data of the corresponding one of the plurality of primary sub-regions.

Step S102: training each one of the plurality of fine positioning models with the records of WI-FI® fingerprint data of the corresponding one of the plurality of secondary sub-regions.

The so-called "training" divides pre-processed WI-FI® fingerprint data and spatial coordinates into a training set and a validation set according to an appropriate ratio and random order, and the training set is used to train the global positioning model, the coarse positioning models and the fine positioning models. The validation set is input into the global positioning model, the coarse positioning models and the fine positioning models to evaluate whether the global positioning model, the coarse positioning models and the fine positioning models achieve the expected positioning accuracy. If the expected positioning accuracy has not been achieved, the global positioning model, the coarse positioning models and the fine positioning models are adjusted with hyperparameters, and the global positioning model, the coarse positioning models and the fine positioning models are continuously trained with the training set until they pass the performance test, and the global positioning model, the coarse positioning models and the fine positioning models that have passed the performance test will be used as the group of neural network models.

Figure 7:
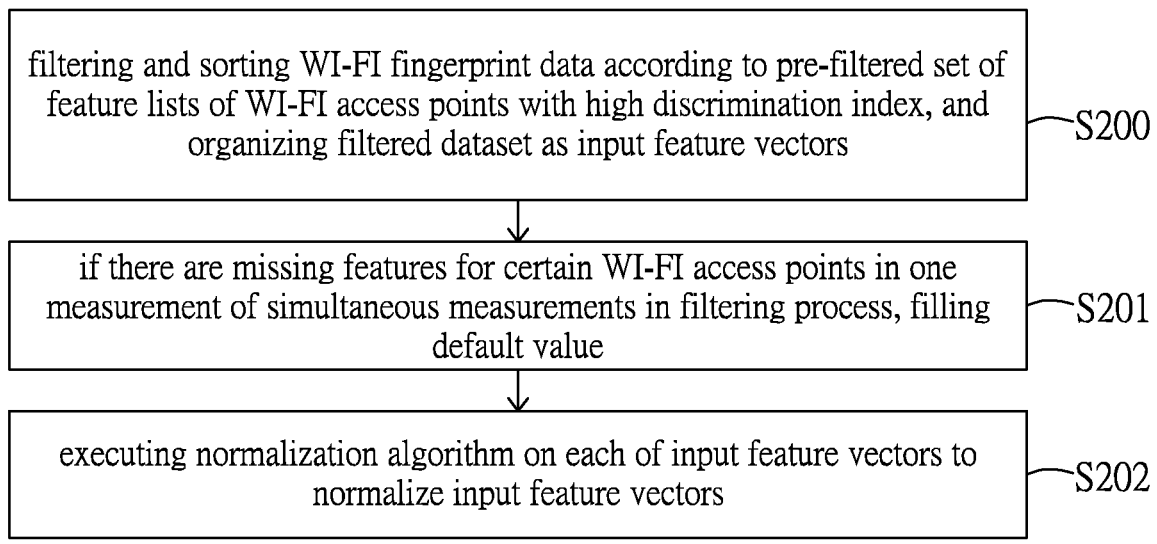
FIG. 7 is a flowchart of a preprocessing process according to an embodiment of the present disclosure.

Furthermore, the above-mentioned training process further includes performing a pre-processing process on the plurality of records of WI-FI® fingerprint data. For further reference, FIG. 7 is a flowchart of a preprocessing process according to an embodiment of the present disclosure. The preprocessing process can include the following steps:

Step S200: filtering and sorting the plurality of records of WI-FI® fingerprint data according to a pre-filtered set of feature lists of WI-FI® access points with high discrimination index, and organizing filtered dataset as a plurality of input feature vectors. The pre-filtered set of feature lists of WI-FI® access points with high discrimination index is generated by: sorting all relevant WI-FI® fingerprint data and count all available WI-FI® access points to form feature lists of WI-FI® access points, filtering and sorting the feature lists of the available WI-FI® access points according to a specified discrimination index evaluation criteria to generate the set of feature lists of WI-FI® access points with high discrimination index. The above-mentioned discrimination index evaluation criteria can be, for example, an average appearance rate of WI-FI® access point features, an average signal strength or an information gain value related to spatial distribution of WI-FI® access point features. Then, according to these lists, each record of data in all relevant WI-FI® fingerprint data is sorted into an input feature vector InpV.

Step S201: in the filtering process, if there are missing features for certain WI-FI® access points in one measurement of simultaneous measurements, a default value is filled in. In detail, in the process of sorting the input feature vector InpV, since each record of WI-FI® scan results will not completely scan all of the feature values, a large part of the values must have not been measured and need to be filled in with a substitute value. The substituted value filled in should be sufficient to represent an unmeasured state without affecting the training process of the models. For example, if physical meaning of these features is the signal strength, the unmeasured value is filled with the minimum value in the feature vector, which will be reduced to zero in the next step after combining with a normalization algorithm, which means that the signal is extremely weak or has not been measured. Generally speaking, in the feature vector InpV sorted out from one record of WI-FI® scan results, only about 30% to 40% of the feature values have been collected, and the rest must be filled in with the substitute values. In advanced designs of some embodiments, in addition to each feature vectors in the training data, nearly 60% of the values have not been measured due to the above-mentioned reasons. During the model training process, certain values in the feature vectors can be dynamically selected according to appropriate proportions and random processes as unmeasured values. Regardless of whether the selected values are originally unmeasured or valid measured values, they are all set as unmeasured values, and this operation is called a "dropout". As a result, unmeasured proportion of one record of the feature vectors has increased to about 70% to 80%. The purpose of this operation is to perform "data augmentation" for expanding a set of better training data into a larger amount of but inferior data, such that models to be trained can adapt to sparser data and harsher input situations, forcing the models to learn general pattern, while avoiding over-fitting.

Step S202: executing a normalization algorithm on each of the input feature vectors to normalize the input feature vectors to complete the preprocessing process. Here, when the positioning map data is created, the time point, collection device, or acquisition condition of the WI-FI® fingerprint data may be different. Therefore, relative values between multiple feature values measured at the same time (such as the signal strength of WI-FI® access point) should be relatively stable and have more referential information. The purpose of the normalization algorithm is to extract characteristics of the input feature vector against relative strengths of the WI-FI® fingerprint data, thereby training the global positioning model, the coarse positioning models and the fine positioning models.

Figure 8:
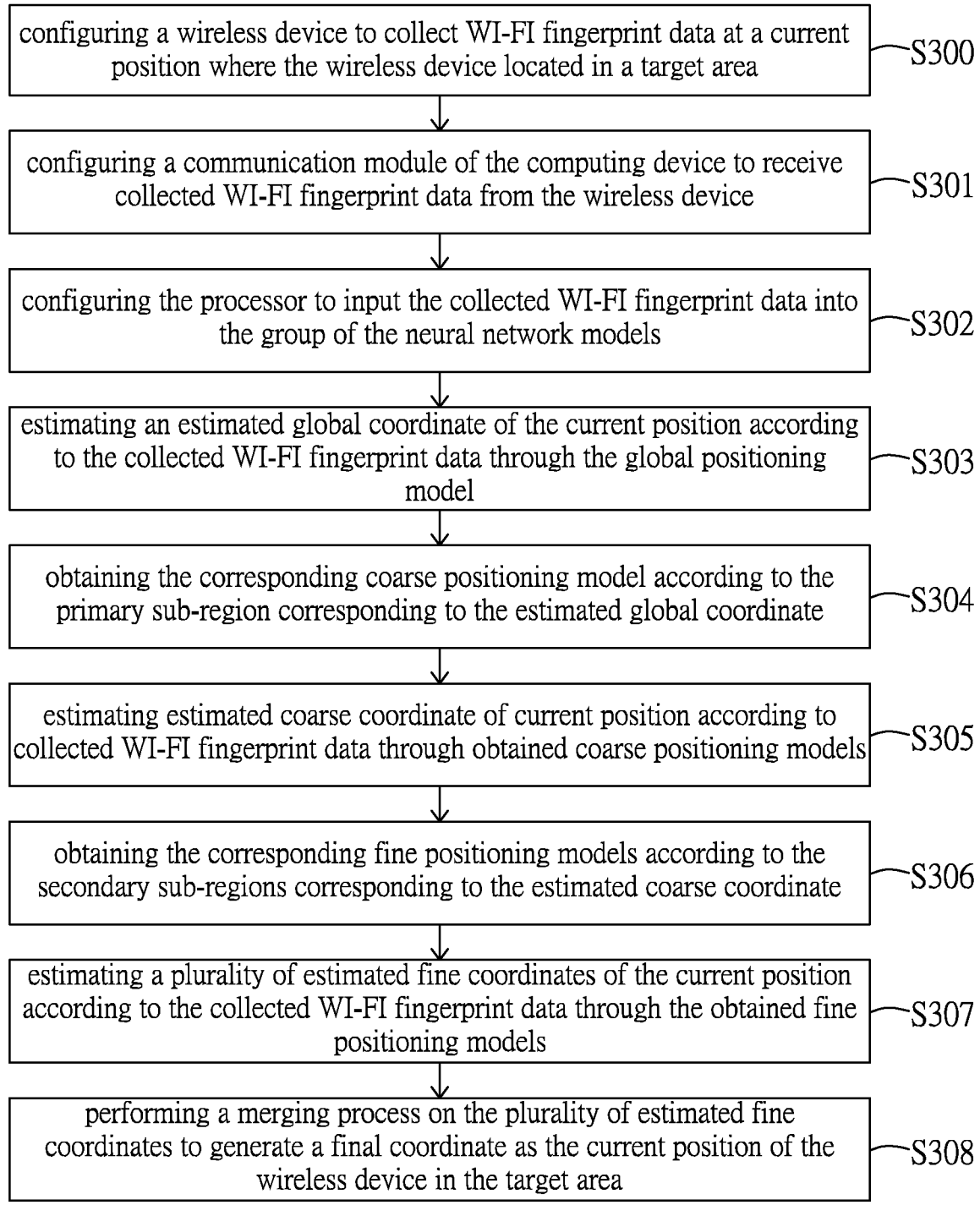
FIG. 8 is a flowchart of a positioning method based on neural network models according to an embodiment of the present disclosure.

After the training process is completed and the group of neural network models of the embodiment of the present disclosure is obtained, the positioning method based on neural network models of the present disclosure can be executed. Reference can be further made to FIG. 8, which is a flowchart of a positioning method based on neural network models according to an embodiment of the present disclosure. As shown in FIG. 8, the positioning method based on the neural network models can include the following steps:

Step S300: configuring a wireless device to collect WI-FI® fingerprint data at a current position where the wireless device located in a target area. For example, the wireless device can be used as an object to be measured, or be set at the same location as the object to be measured, to obtain the WI-FI® fingerprint data of the current position of the object under test. For example, received multiple wireless signals provided by multiple WI-FI® access points, and multiple corresponding signal strengths at the current position.

Step S301: configuring a communication module of the computing device to receive collected WI-FI® fingerprint data from the wireless device.

Figure 9:
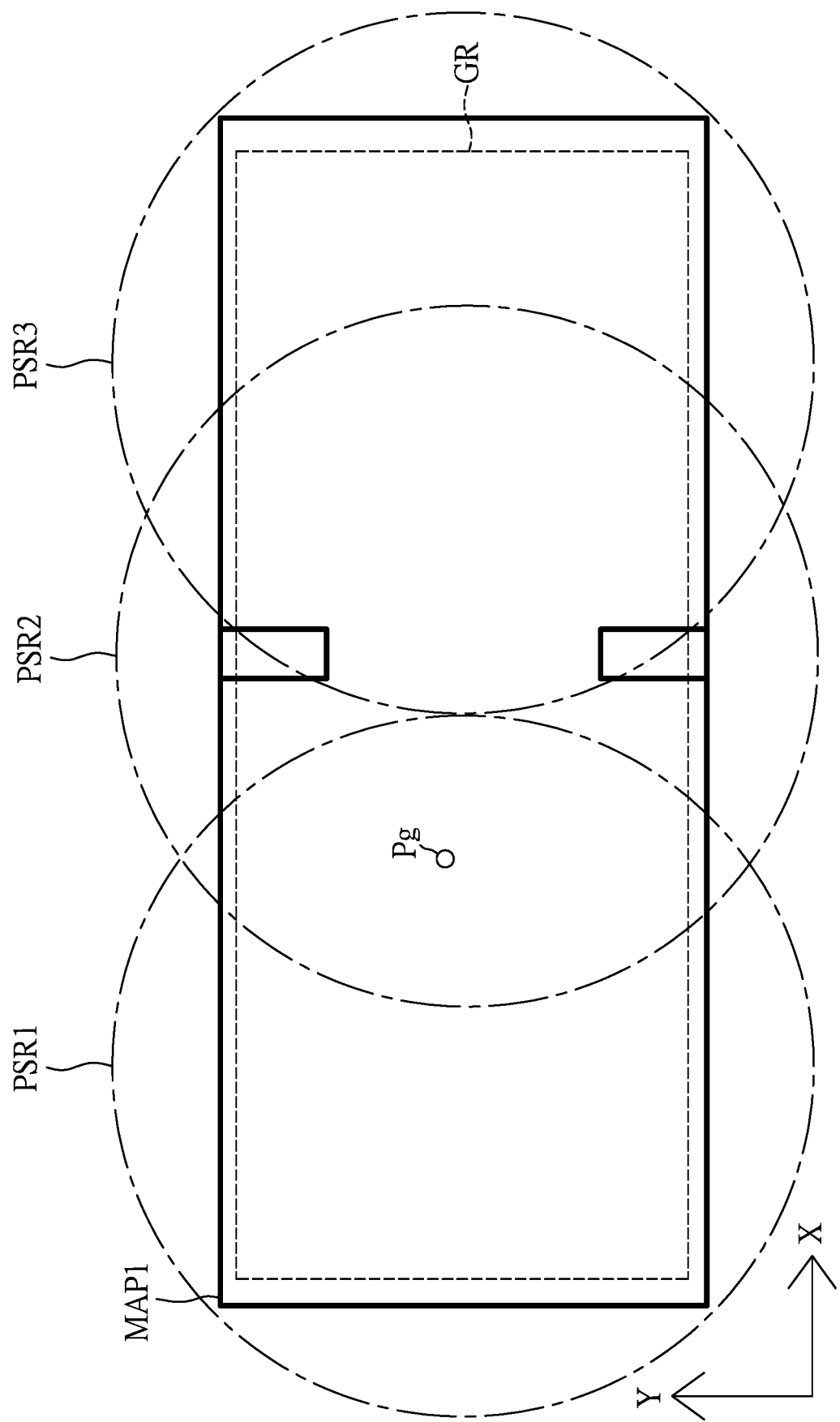
FIG. 9 is a schematic diagram showing an estimated global coordinate and corresponding primary sub-regions according to an embodiment of the present disclosure.

Step S302: configuring the processor to input the collected WI-FI® fingerprint data into the group of the neural network models, and perform the following steps:

Step S303: estimating an estimated global coordinate of the current position according to the collected WI-FI® fingerprint data through the global positioning model. For example, reference is made to FIG. 9, which is a schematic diagram showing an estimated global coordinate and corresponding primary sub-regions according to an embodiment of the present disclosure. The global coordinate Pg estimated by the global positioning model is located at the overlap of the primary sub-regions PSR1 and PSR2 as shown in FIG. 9.

Step S304: obtaining the corresponding coarse positioning model according to the primary sub-region corresponding to the estimated global coordinate. As shown in FIG. 9, the global coordinate Pg in this embodiment corresponds to the primary sub-regions PSR1 and PSR2. Therefore, the coarse positioning models previously trained through the WI-FI® fingerprint data in the primary sub-regions PSR1 and PSR2 are taken out, for example, coarse positioning models CPM1 and CPM2.

Figure 10:
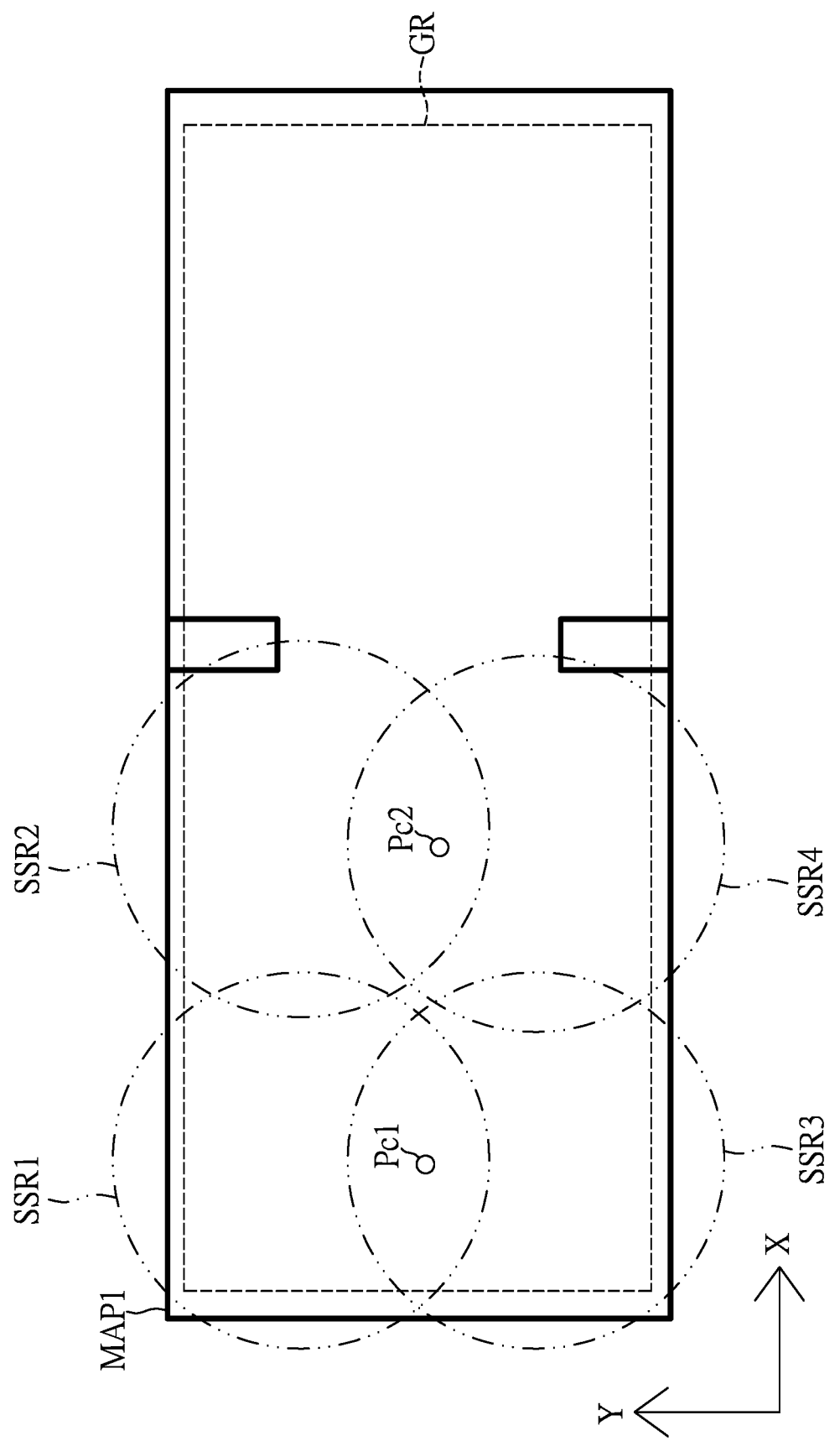
FIG. 10 is a schematic diagram showing estimated coarse coordinates and corresponding secondary sub-regions according to an embodiment of the present disclosure.

Step S305: estimating an estimated coarse coordinate of the current position according to the collected WI-FI® fingerprint data through the obtained coarse positioning models. For example, reference is made to FIG. 10, which is a schematic diagram showing estimated coarse coordinates and corresponding secondary sub-regions according to an embodiment of the present disclosure. The estimated coarse coordinate Pc1 located by the coarse positioning model CPM1 is located at the overlap of the secondary sub-regions SSR1 and SSR3 as shown in FIG. 10, and the estimated coarse coordinate Pc2 located by the coarse positioning model CPM2 is located at the overlap of the secondary sub-regions SSR2 and SSR4.

Step S306: obtaining the corresponding fine positioning models according to the secondary sub-regions corresponding to the estimated coarse coordinate. As shown in FIG. 10, the estimated coarse coordinate Pc1 corresponds to the secondary sub-regions SSR1 and SSR3 in this embodiment. Therefore, the fine positioning models trained by the WI-FI® fingerprint data in the secondary sub-regions SSR1 and SSR3 are taken out, for example, fine positioning models FPM1 and FPM3. On the other hand, the estimated coarse coordinate Pc2 corresponds to the secondary sub-regions SSR2 and SSR4. Therefore, the fine positioning models previously trained through the WI-FI® fingerprint data in the secondary sub-regions SSR2 and SSR4 are taken out, for example, fine positioning models FPM2 and FPM4.

Step S307: estimating a plurality of estimated fine coordinates of the current position according to the collected WI-FI® fingerprint data through the obtained fine positioning models. For example, reference can be made to FIG. 11, which is a schematic diagram showing estimated fine coordinates and corresponding secondary sub-regions according to an embodiment of the present disclosure. The estimated fine coordinates Pf1 to Pf4 located through the fine positioning models FPM1 to FPM4 can be shown in FIG. 11.

Step S308: performing a merging process on the plurality of estimated fine coordinates to generate a final coordinate as the current position of the wireless device in the target area.

Figure 11:
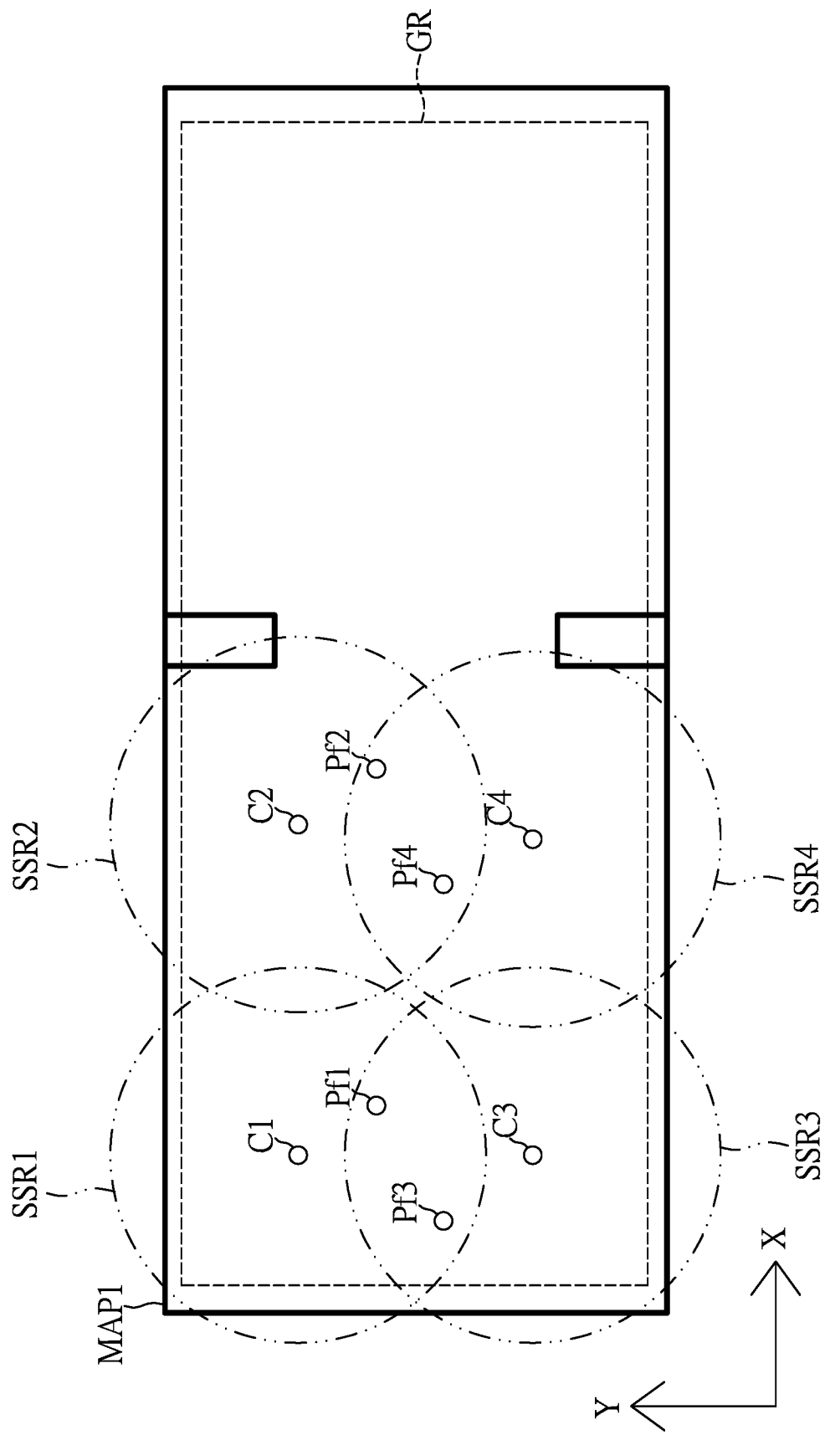
FIG. 11 is a schematic diagram showing estimated fine coordinates and corresponding secondary sub-regions according to an embodiment of the present disclosure.
Figure 12:
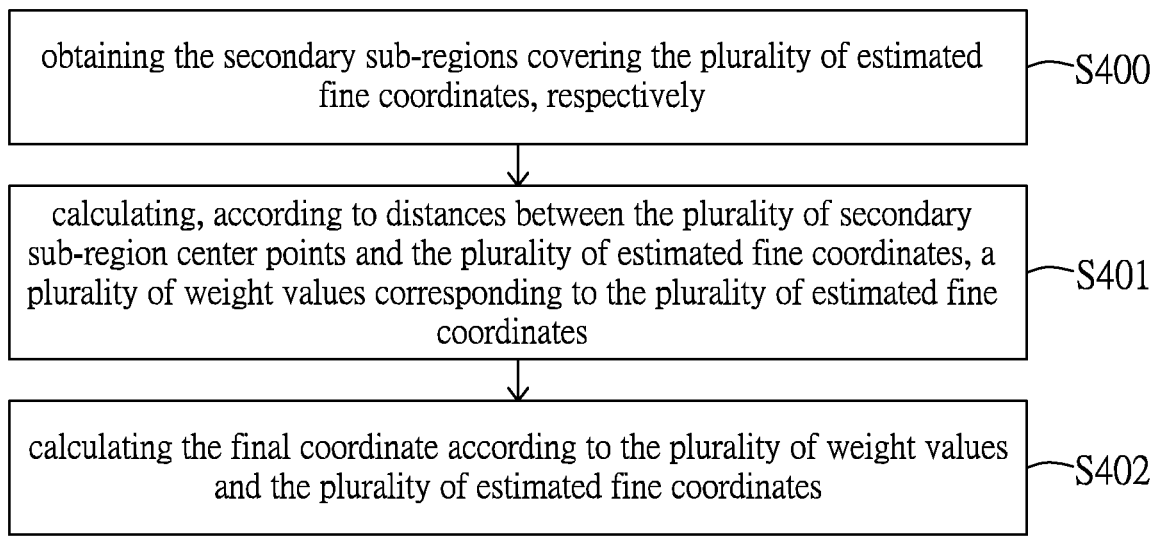
FIG. 12 is a flowchart of a merging process according to an embodiment of the present disclosure.

Further reference can be made to FIG. 12, which is a flowchart of a merging process according to an embodiment of the present disclosure. As shown in FIG. 12, the merging process can further include the following steps:

Step S400: obtaining the secondary sub-regions covering the plurality of estimated fine coordinates, respectively. As shown in FIG. 11, the plurality of secondary sub-regions respectively correspond to a plurality of secondary sub-region center points. For example, the secondary sub-regions SSR1 to SSR4 correspond to the secondary sub-region center points C1, C2, C3, and C4, respectively. The secondary sub-regions covering the estimated fine coordinates Pf1 and Pf3 are secondary sub-regions SSR1 and SSR3, and the secondary sub-regions covering the estimated fine coordinates Pf2 and Pf4 are secondary sub-regions SSR2 and SSR4.

Step S401: calculating, according to distances between the plurality of secondary sub-region center points and the plurality of estimated fine coordinates, a plurality of weight values corresponding to the plurality of estimated fine coordinates. For example, weight values corresponding to the estimated fine coordinate Pf1 are calculated based on distances between the estimated fine coordinate Pf1 and the center points C1 and C3 of the secondary sub-regions SSR1 and SSR3, and the weight values corresponding to the estimated fine coordinates Pf2, Pf3, and Pf4 can be obtained similarly.

Step S402: calculating the final coordinate according to the plurality of weight values and the plurality of estimated fine coordinates. For example, coordinates of the estimated fine coordinates Pf1, Pf2, Pf3, and Pf4 can be respectively multiplied by corresponding weight values to obtain the final coordinate, which is used as the current position of the wireless device in the target area.

Figure 13:
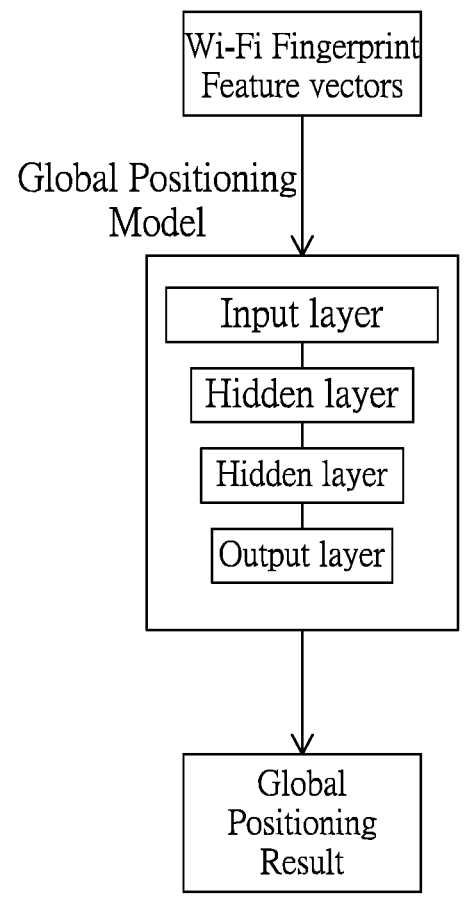
FIG. 13 is a specific architecture diagram for a global positioning model according to an embodiment of the present disclosure.

FIG. 13 is a specific architecture diagram for a global positioning model according to an embodiment of the present disclosure. In this embodiment, the global positioning model is used to determine the primary sub-region of the building and floor where the object to be determined is located according to the input feature vector.

Figure 14:
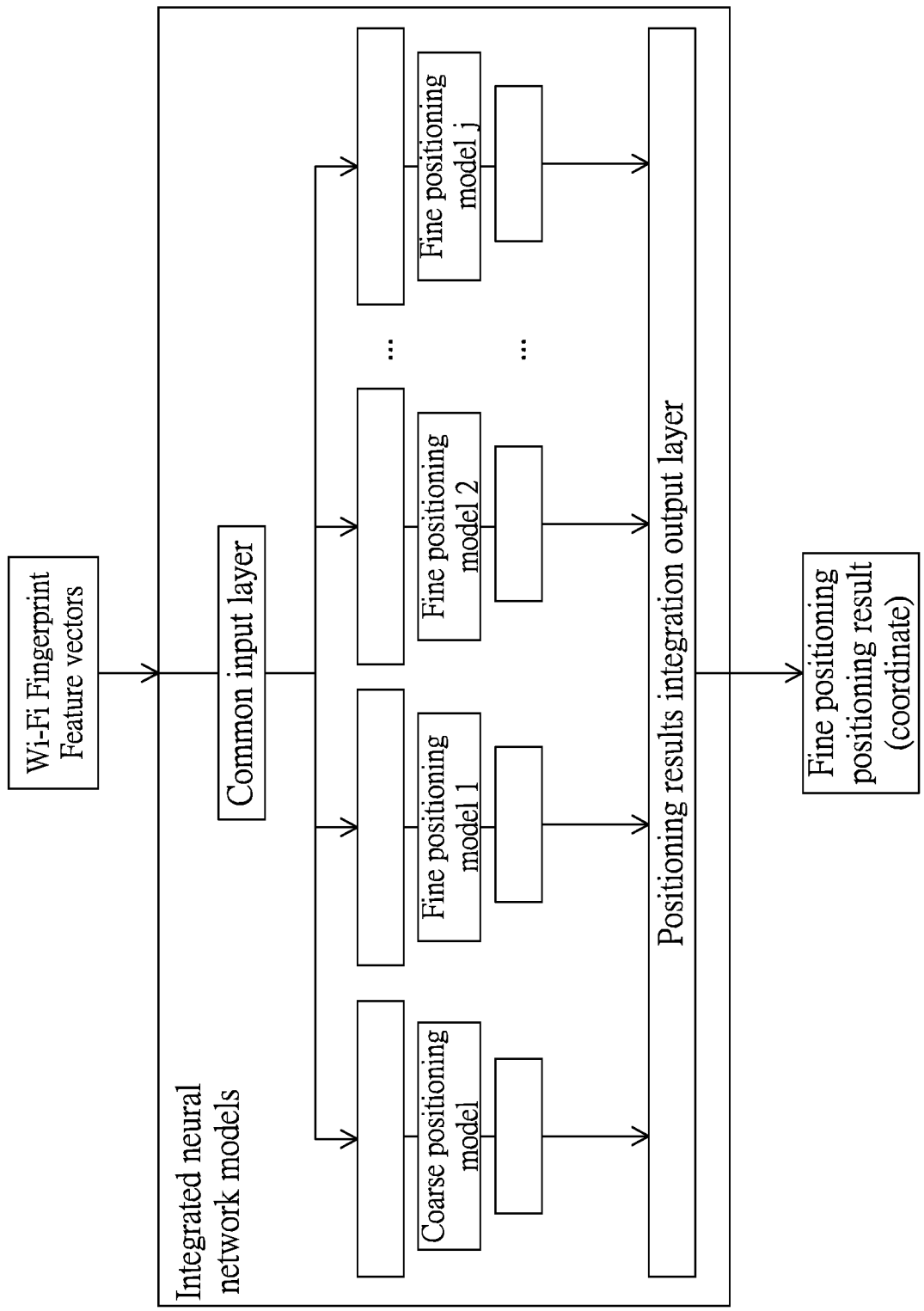
FIG. 14 is a specific architecture diagram of an integrated positioning model according to an embodiment of the present disclosure.

FIG. 14 is a specific architecture diagram of an integrated positioning model according to an embodiment of the present disclosure. In this embodiment, the coarse and fine positioning models are integrated into a large neural network model, while coarse and fine positioning predictions in the primary sub-region are performed. Positioning results of each of the fine positioning models are integrated according to the positioning results of the coarse positioning model through a built-in integrated output layer, and the integrated fine positioning results are output. There are a plurality of integrated neural network models in the entire positioning system and corresponding to a plurality of primary sub-regions, respectively. The purpose of this integration is to classify the primary sub-regions through the global positioning model to take into account scalability of positioning scope of the positioning system; and then use the integrated neural network model to simultaneously execute the coarse and fine positioning models to improve operation efficiency and accuracy for the positioning models.

Figure 15:
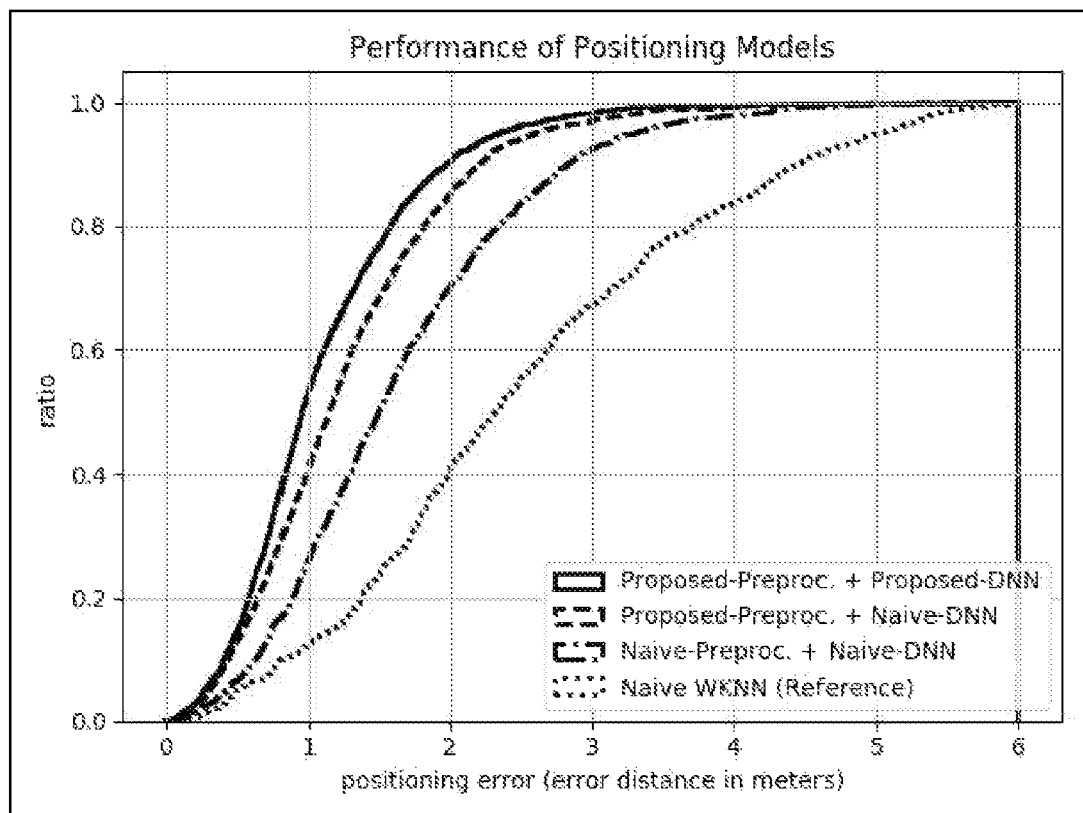
FIG. 15 is a comparison diagram of positioning performance of trained models according to an embodiment of the present disclosure.

FIG. 15 is a comparison diagram of positioning performance of trained models according to an embodiment of the present disclosure. FIG. 15 shows the positioning performance with cumulative distribution function and ratio of positioning error distance (meter as units), and FIG. 15 also shows the positioning performances of the four model configurations, namely: the provided preprocessing method with the provided deep neural network model (solid line segment, Proposed-Preproc.+Proposed-DNN); the provided preprocessing method with a simple deep neural network model (long dashed line segment, Proposed-Preproc.+Naïve-DNN); simple preprocessing method with simple deep neural network model (long and short dashed line segments, Naïve-Preproc.+Naïve-DNN); simple KNN model (short dashed line segment, Naïve-KNN). It can be observed from FIG. 15 that the best positioning performance is the proposed preprocessing method combined with the proposed deep neural network model, which achieves the lowest 50% positioning error of about 1 m. The worst positioning performance is the simple KNN model, and 50% of the positioning error thereof is about 2.4 m.

In conclusion, the positioning system and positioning method based on the neural network models provided by the present disclosure can effectively improve the positioning performance of the model by using the preprocessing process for the feature values, and reduce positioning performance interferences caused by time, space, and measurement deviations between devices.

Furthermore, the positioning system and positioning method based on the neural network models provided by the present disclosure can progressively refine the coordinate of an object to be measured by adopting the group of the neural network models, from a large scope to a small scope and from low accuracy to high accuracy.

In addition, multiple positioning models are individually trained using different subsets of WI-FI® fingerprint data according to the divided global area, primary sub-regions, and secondary sub-regions, thereby obtaining trained positioning models having different positioning scopes and different positioning accuracies, the time required for initial positioning and the overall system computing resources used during positioning can be saved, and high accuracy can be maintained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A positioning system based on neural network models, the positioning system comprising:
    a wireless device configured to collect WI-FI fingerprint data at a current position where the wireless device is located in a target area; and
    a computing device, including:
    a processor;
    a communication module configured to receive the collected WI-FI fingerprint data from the wireless device; and
    a database configured to store positioning map data of the target area and a group of neural network models, wherein the positioning map data includes a plurality of records of WI-FI fingerprint data corresponding to a plurality of collection points in the target area, the target area is divided into a plurality of primary sub-regions, and each of the primary sub-regions further includes a plurality of secondary sub-regions,
    wherein the group of neural network models is generated by performing a training process according to the positioning map data and a model definition file, and the group of neural network models includes:
    a global positioning model for estimating a global coordinate in the target area based on input WI-FI fingerprint data;
    a plurality of coarse positioning models respectively corresponding to the primary sub-regions, wherein each of the coarse positioning models is used for estimating a coarse coordinate in the corresponding primary sub-region based on the input WI-FI fingerprint data; and
    a plurality of fine positioning models respectively corresponding to the plurality of secondary sub-regions, wherein each of the plurality of fine positioning models is used for estimating a fine coordinate in the secondary sub-region based on the input WI-FI fingerprint data;
    wherein the processor is configured to input the collected WI-FI fingerprint data into the trained group of neural network models, and execute following steps:
    estimating an estimated global coordinate of the current position according to the collected WI-FI fingerprint data through the global positioning model;
    obtaining the corresponding coarse positioning models according to the primary sub-regions corresponding to the estimated global coordinate;
    estimating an estimated coarse coordinate of the current position according to the collected WI-FI fingerprint data through the obtained coarse positioning models;
    obtaining the corresponding fine positioning models according to the secondary sub-regions corresponding to the estimated coarse coordinate;
    estimating a plurality of estimated fine coordinates of the current position according to the collected WI-FI fingerprint data through the obtained fine positioning models; and
    performing a merging process on the plurality of estimated fine coordinates to generate a final coordinate as the current position of the wireless device in the target area.

2. The positioning system according to claim 1, wherein the training process includes:
    training the global positioning model with the plurality of records of WI-FI fingerprint data in the target area;
    training each one of the plurality of coarse positioning models with the plurality of records of WI-FI fingerprint data of the corresponding one of the plurality of primary sub-regions; and
    training each one of the plurality of fine positioning models with the plurality of records of WI-FI fingerprint data of the corresponding one of the plurality of secondary sub-regions.

3. The positioning system according to claim 2, wherein the training process further includes performing a preprocessing process on the plurality of records of WI-FI fingerprint data, and the preprocessing process includes:
    filtering and sorting the plurality of records of WI-FI fingerprint data according to a plurality of feature lists of WI-FI access points with high discrimination index to generate a plurality of input feature vectors,
    wherein the plurality of feature lists of WI-FI access points with high discrimination index each includes a plurality of WI-FI access points and a plurality of feature values corresponding to the plurality of WI-FI access points, the plurality of input feature vectors each has a plurality of elements, and the plurality of input feature vectors each corresponds to actual measurement values obtained by performing a simultaneous measurement on the plurality of WI-FI access points in the plurality of feature lists of WI-FI access points with high discrimination index, and the plurality of records of WI-FI fingerprint data correspond to the plurality of input feature vectors;
    determining whether the actual measurement values obtained from the simultaneous measurement performed on the plurality of WI-FI access points are missing, and when missing, filling in the missing actual measurement values with a default value; and
    executing a normalization algorithm on each of the plurality of input feature vectors to normalize the input feature vectors.

4. The positioning system according to claim 3, wherein the merging process includes:
    obtaining the plurality of secondary sub-regions covering the plurality of estimated fine coordinates, respectively, wherein the plurality of secondary sub-regions respectively correspond to a plurality of secondary sub-region center points;
    calculating, according to distances between the plurality of secondary sub-region center points and the plurality of estimated fine coordinates, a plurality of weight values corresponding to the plurality of estimated fine coordinates; and
    calculating the final coordinate according to the plurality of weight values and the plurality of estimated fine coordinates.

5. The positioning system according to claim 1, wherein the global positioning model, the plurality of coarse positioning models and the plurality of fine positioning models are each a deep neural network model, the deep neural network model includes an input layer, a plurality of hidden layers, and an output layer, and the input layer, the plurality of hidden layers, and the output layer each have an activation function, and is used to non-linearly adjust output results of the input layer, the plurality of hidden layers and the output layer.

6. A positioning method based on neural network models, the positioning method comprising:

configuring a wireless device to collect WI-FI fingerprint data at a current position where the wireless device located in a target area;

configuring a communication module included in a computing device to receive the collected WI-FI fingerprint data from the wireless device, wherein the computing device further includes a processor and a database, and the database is configured to store positioning map data of the target area and a group of neural network models, wherein the positioning map data includes a plurality of records of WI-FI fingerprint data corresponding to a plurality of collection points in the target area, the target area is divided into a plurality of primary sub-regions, and each of the primary sub-regions further includes a plurality of secondary sub-regions, wherein the group of neural network models is generated by performing a training process according to the positioning map data and a model definition file, and the group of neural network models includes:

a global positioning model for estimating a global coordinate in the target area based on input WI-FI fingerprint data;

a plurality of coarse positioning models respectively corresponding to the primary sub-regions, wherein each of the coarse positioning models is used for estimating a coarse coordinate in the corresponding primary sub-region based on the input WI-FI fingerprint data; and a plurality of fine positioning models respectively corresponding to the plurality of secondary sub-regions, wherein each of the plurality of fine positioning models is used for estimating a fine coordinate in the secondary sub-region based on the input WI-FI fingerprint data;

configuring the processor to input the collected WI-FI fingerprint data into the group of neural network models, and perform following steps:

estimating an estimated global coordinate of the current position according to the collected WI-FI fingerprint data through the global positioning model;

obtaining the corresponding coarse positioning model according to the primary sub-region corresponding to the estimated global coordinate;

estimating an estimated coarse coordinate of the current position according to the collected WI-FI fingerprint data through the obtained coarse positioning models;

obtaining the corresponding fine positioning models according to the secondary sub-regions corresponding to the estimated coarse coordinate;

estimating a plurality of estimated fine coordinates of the current position according to the collected WI-FI fingerprint data through the obtained fine positioning models; and performing a merging process on the plurality of estimated fine coordinates to generate a final coordinate as the current position of the wireless device in the target area.

7. The positioning method according to claim 6, wherein the training process includes: training the global positioning model with the plurality of records of WI-FI fingerprint data in the target area; training each one of the plurality of coarse positioning models with the plurality of records of WI-FI fingerprint data of the corresponding one of the plurality of primary sub-regions; and training each one of the plurality of fine positioning models with the plurality of records of WI-FI fingerprint data of the corresponding one of the plurality of secondary sub-regions.

8. The positioning method according to claim 7, wherein the training process further includes performing a preprocessing process on the plurality of records of WI-FI fingerprint data, and the preprocessing process includes: filtering the plurality of records of WI-FI fingerprint data by a first predetermined number, and sorting the filtered records of WI-FI fingerprint data to form an input feature vector, wherein the input feature vector has a second predetermined number of elements; filling in the elements corresponding to a difference number between the second predetermined number and the first predetermined number with a default value; and executing a normalization algorithm on each of the plurality of input feature vectors to normalize the input feature vectors.

9. The positioning method according to claim 8, wherein the merging process includes:

obtaining the plurality of secondary sub-regions covering the plurality of estimated fine coordinates, respectively, wherein the plurality of secondary sub-regions respectively correspond to a plurality of secondary sub-region center points;

calculating, according to distances between the plurality of secondary sub-region center points and the plurality of estimated fine coordinates, a plurality of weight values corresponding to the plurality of estimated fine coordinates; and calculating the final coordinate according to the plurality of weight values and the plurality of estimated fine coordinates.

10. The positioning method according to claim 6, wherein the global positioning model, the plurality of coarse positioning models and the plurality of fine positioning models are each a deep neural network model, the deep neural network model includes an input layer, a plurality of hidden layers, and an output layer, and the input layer, the plurality of hidden layers, and the output layer each have an activation function, and is used to non-linearly adjust output results of the input layer, the plurality of hidden layers and the output layer.

* * * * *